United States Patent
Lee et al.

(10) Patent No.: US 9,576,389 B2
(45) Date of Patent: Feb. 21, 2017

(54) METHOD AND APPARATUS FOR GENERATING ACCELERATION STRUCTURE IN RAY TRACING SYSTEM

(71) Applicants: Samsung Electronics Co., Ltd., Suwon-si (KR); Industry-Academic Cooperation Foundation, Yonsei University, Seoul (KR)

(72) Inventors: Jaedon Lee, Yongin-si (KR); Jinwoo Kim, Seoul (KR); Youngsam Shin, Hwaseong-si (KR); Minwoo Lee, Gwangju (KR); Wonjong Lee, Seoul (KR); Tackdon Han, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 171 days.

(21) Appl. No.: 14/520,538

(22) Filed: Oct. 22, 2014

(65) Prior Publication Data
US 2015/0109292 A1    Apr. 23, 2015

(30) Foreign Application Priority Data
Oct. 22, 2013 (KR) .................. 10-2013-0126111

(51) Int. Cl.
*G06T 15/06* (2011.01)

(52) U.S. Cl.
CPC ..................................... *G06T 15/06* (2013.01)

(58) Field of Classification Search
CPC .................................................... G06T 15/06
See application file for complete search history.

(56) References Cited

U.S. PATENT DOCUMENTS

| 8,188,997 B2 | 5/2012 | Dammertz et al. |
| 2012/0081368 A1* | 4/2012 | Park .............. G06T 15/005 345/426 |

FOREIGN PATENT DOCUMENTS

| KR | 10-1072093 B1 | 10/2011 |
| KR | 10-2012-0047778 A | 5/2012 |

OTHER PUBLICATIONS

Méndez-Feliu, Àlex, and Mateu Sbert. "From obscurances to ambient occlusion: A survey." The Visual Computer 25.2 (2009): 181-196.*

Méndez, A. F., M. Sbert, and L. Neumann. "Obscurances for ray-tracing." Proceedings of Eurographics' 03 (short papers) (2003).*

(Continued)

*Primary Examiner* — Daniel Hajnik
(74) *Attorney, Agent, or Firm* — NSIP Law

(57) ABSTRACT

Provided are an apparatus and method for generating an acceleration structure in a ray tracing system. The method of generating an acceleration structure includes splitting, at an acceleration structure generator, a space comprising a three-dimensional (3D) object into a plurality of sub spaces, calculating costs for traversing the plurality of sub spaces based on occlusion information of primitives in the plurality of sub spaces, selecting the plurality of sub spaces that minimize the costs for traversing, and generating an acceleration structure based on setting the selected plurality of sub spaces as nodes.

16 Claims, 7 Drawing Sheets

(56) References Cited

OTHER PUBLICATIONS

Havran, Vlastimil. "Heuristic Ray Shooting Algorithms." Faculty of Electrical Engineering, Czech Technical University, Revision 1.0 (Nov. 30, 2000), Revision 1.1 (May 8, 2001). (220 pages).

Havran, Vlastimil, and JiříBittner. "On Improving KD-Trees For Ray Shooting." Journal of WSCG vol. 10 No. 1-3 (2002). (8 pages).

Aila, Timo, et al. "Understanding the Efficiency of Ray Traversal on GPUs." Proceedings of the Conference on High Performance Graphics, ACM (2009). (5 pages).

Stich, Martin, et al. "Spatial Splits in Bounding Volume Hierarchies." Proceedings of the Conference on High Performance Graphics, ACM (2009). (7 pages).

Tiryaki, Ufuk. "Design and Implementation of Rendering System with Ray Tracing and Ambient Occlusion." CmpE492, Senior Project Final Report Computer Engineering Department, Bogazici University (Jun. 2009). (24 pages).

Egan, Kevin, et al. "Practical Filtering for Efficient Ray-Traced Directional Occlusion." ACM Transactions on Graphics (TOG). vol. 30. No. 6. ACM, 2011. (10 pages).

Vinkler, Marek, et al. "Visibility driven BVH build up algorithm for ray tracing." Computers & Graphics vol. 36 (2012). pp. 283-296.

\* cited by examiner

METHOD AND APPARATUS FOR GENERATING ACCELERATION STRUCTURE IN RAY TRACING SYSTEM

RELATED APPLICATIONS

This application claims the benefit under 35 USC 119(a) of Korean Patent Application No. 10-2013-0126111, filed on Oct. 22, 2013, in the Korean Intellectual Property Office, the entire disclosure of which is incorporated herein by reference for all purposes.

BACKGROUND

1. Field

The following description relates to methods and apparatuses for generating an acceleration structure in a ray tracing system, which are capable of minimizing costs for detecting an acceleration structure.

2. Description of Related Art

Three-dimensional (3D) rendering refers to image processing for synthesizing 3D object data to be viewed at a given viewpoint of a camera. Examples of rendering methods include a rasterization method of generating an image while projecting 3D objects on a screen, a ray tracing method of generating an image by tracing the path of incident light by using a ray of each of pixels of the image at a camera viewpoint, etc.

When the ray tracing is used, a high-quality image may be generated by reflecting the physical properties of light (reflecting, refracting, penetrating properties, etc.) into a rendering result but the amount of computation is relatively high, thus making it difficult to perform rendering at high speeds. In ray tracing, generating an acceleration structure (hereinafter referred to as 'AS') by spatially splitting a scene object to be rendered, traversing the AS (hereinafter referred to as 'TRV'), and conducting an intersection test between a ray and a primitive (hereinafter referred to as 'IST') require large amount of calculation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of generating an acceleration structure in a ray tracing system, the method including splitting, at an acceleration structure generator, a space comprising a three-dimensional (3D) object into a plurality of sub spaces, calculating costs for traversing the plurality of sub spaces based on occlusion information of primitives in the plurality of sub spaces, selecting the plurality of sub spaces that minimize the costs for traversing, and generating an acceleration structure based on setting the selected plurality of sub spaces as nodes.

The occlusion information of a primitive may represent a degree to which the primitive is occluded by a neighboring primitive.

The occlusion information of the primitives may be based on an ambient occlusion (AO) ray generated from the primitive.

The occlusion information of the primitives may represent a degree to which an ambient occlusion (AO) ray intersects neighboring primitives.

The calculating of the costs for traversing the plurality of sub spaces may include determining a value of the occlusion information of the primitives to be between '0' and '1' when an ambient occlusion (AO) ray intersects neighboring primitives within a predetermined range, and to be '1' when the AO ray does not intersect the neighboring primitives within the predetermined range.

The costs for traversing the plurality of sub spaces may be calculated, based on at least one of costs for conducting a ray-node intersection test, a probability that a ray will pass through each of the plurality of sub spaces, the sum of the occlusion information of the primitives included in the plurality of sub spaces, or costs for conducting a ray-primitive intersection test.

The costs for traversing the plurality of sub spaces may be calculated based on a surface area heuristic (SAH) method.

The costs for traversing the plurality of sub spaces may be calculated based on: $T=2 \times T1 + A(S1)/A(S) \times AO(S1) \times T2 + A(S2)/A(S) \times AO(S2) \times T2$, wherein T denotes the costs for traversing the plurality of sub spaces, T1 denotes a cost for conducting a ray-node intersection test, A(S1) denotes a surface area of primitives in a first sub space, A(S2) denotes a surface area of primitives in a second sub space, A(S) denotes a surface area of primitives in the space, T2 denotes a cost for conducting a ray-primitive intersection test, AO(S1) denotes a sum of occlusion information of the primitives in the first sub space, and AO(S2) denotes a sum of occlusion information of the primitives in the second sub space.

The calculating of the costs for traversing the plurality of sub spaces may include calculating an average of occlusion information values for a plurality of ambient occlusion (AO) rays when the plurality of AO rays correspond to one primitive and setting the calculated average to an occlusion information value of the primitive.

In another general aspect, there is provided an apparatus for generating an acceleration structure in a ray tracing system, the apparatus including a splitter configured to split a space including a three-dimensional (3D) object into a plurality of sub spaces, a traversing cost calculator configured to calculate costs for traversing the plurality of sub spaces based on occlusion information of primitives included in the plurality of sub spaces, and a controller configured to select the plurality of sub spaces that minimizes the costs for traversing and to generate an acceleration structure based on setting the selected plurality of sub spaces as nodes.

The occlusion information of a primitive may represent a degree to which the primitive is occluded by a neighboring primitive.

The occlusion information of the primitives may be based on an ambient occlusion (AO) ray generated from the primitive.

The occlusion information of the primitives may represent a degree to which an ambient occlusion (AO) ray intersects neighboring primitives.

The traversing cost calculator may be further configured to determine a value of the occlusion information of the primitives to be between '0' and '1' when an ambient occlusion (AO) ray intersects neighboring primitives within a predetermined range, and to be '1' when the AO ray does not intersect the neighboring primitives within the predetermined range.

The traversing cost calculator may be further configured to calculate the costs for traversing the plurality of sub spaces, based on at least one of costs for conducting a ray-node intersection test, a probability that a ray will pass through each of the plurality of sub spaces, the sum of the occlusion information of the primitives included in the plurality of sub spaces, or costs for conducting a ray-primitive intersection test.

The traversing cost calculator may be further configured to calculate the costs for traversing the plurality of sub spaces based on a surface area heuristic (SAH) method.

The traversing cost calculator may be further configured to calculate the costs for traversing the plurality of sub spaces based on: $T=2\times T1+A(S1)/A(S)\times AO(S1)\times T2+A(S2)/A(S)\times AO(S2)\times T2$, wherein T denotes the costs for traversing the plurality of sub spaces, T1 denotes a cost for conducting a ray-node intersection test, A(S1) denotes a surface area of primitives in a first sub space, A(S2) denotes a surface area of primitives in a second sub space, A(S) denotes a surface area of primitives in the space, T2 denotes a cost for conducting a ray-primitive intersection test, AO(S1) denotes a sum of occlusion information of the primitives in the first sub space, and AO(S2) denotes a sum of occlusion information of the primitives in the second sub space.

The traversing cost calculator may be further configured to calculate an average of occlusion information values for a plurality of ambient occlusion (AO) rays when the plurality of AO rays correspond to one primitive, and to set the calculated average as an occlusion information value of the primitive.

In another general aspect, there is provided a ray tracing apparatus including a ray generator configured to generate primary and secondary rays, a traverser (TRV) configured to detect a leaf node that intersects a ray by traversing the information regarding an acceleration structure, an intersector (IST) configured to receive information regarding the detected leaf node, to detect a primitive that intersects the ray, and to calculate a hit point at which the detected primitive and the ray intersect, a shader configured to determine a color value of a pixel based on information regarding the hit point and characteristics of a material at the hit point, and an acceleration structure generator including a splitter configured to split a space comprising a three-dimensional (3D) object into a plurality of sub spaces, a traversing cost calculator configured to calculate costs for traversing the plurality of sub spaces based on occlusion information of primitives comprising the plurality of sub spaces, and a controller configured to select the plurality of sub spaces that minimizes the costs for traversing and to generate the acceleration structure based on setting the selected plurality of sub spaces as nodes.

Other features and aspects will be apparent from the following detailed description, the drawings, and the claims.

Figure 1:
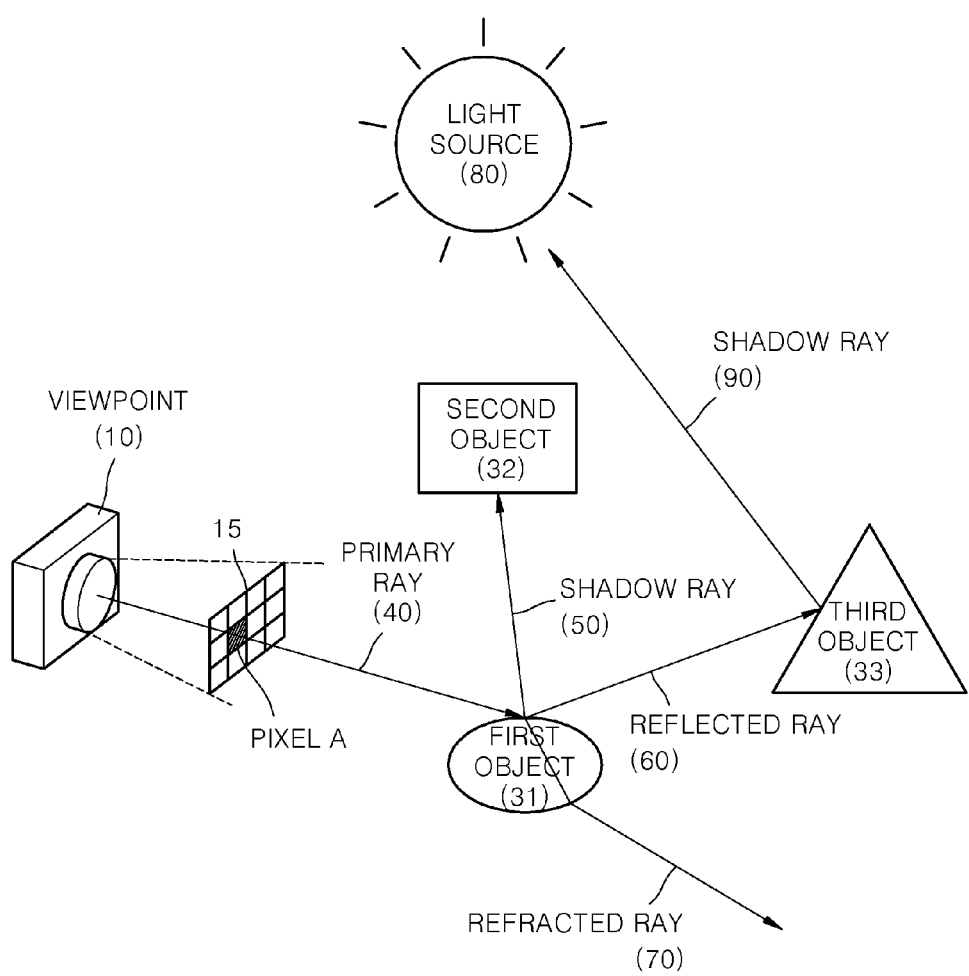
FIG. 1 is a diagram illustrating an example of a general ray tracing method.

Throughout the drawings and the detailed description, unless otherwise described, the same drawing reference numerals will be understood to refer to the same elements, features, and structures. The drawings may not be to scale, and the relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an example of a general ray tracing method. As illustrated in FIG. 1, three-dimensional (3D) modeling may include a light source 80, a first object 31, a second object 32, and a third object 33. For convenience of explanation the first object 31, the second object 32, and the third object 33 are illustrated as two-dimensional (2D) objects in FIG. 1, but the first object 31, the second object 32, and the third object 33 are 3D objects. It may be assumed that the first object 31 has a reflectivity and a refractivity that are greater than '0', and the second object 32 and the third object 33 each have a reflectivity and a refractivity that are '0'. The first object 31 reflects and refracts light, and the second object 32 and the third object 33 do not reflect or refract light.

Figure 2:
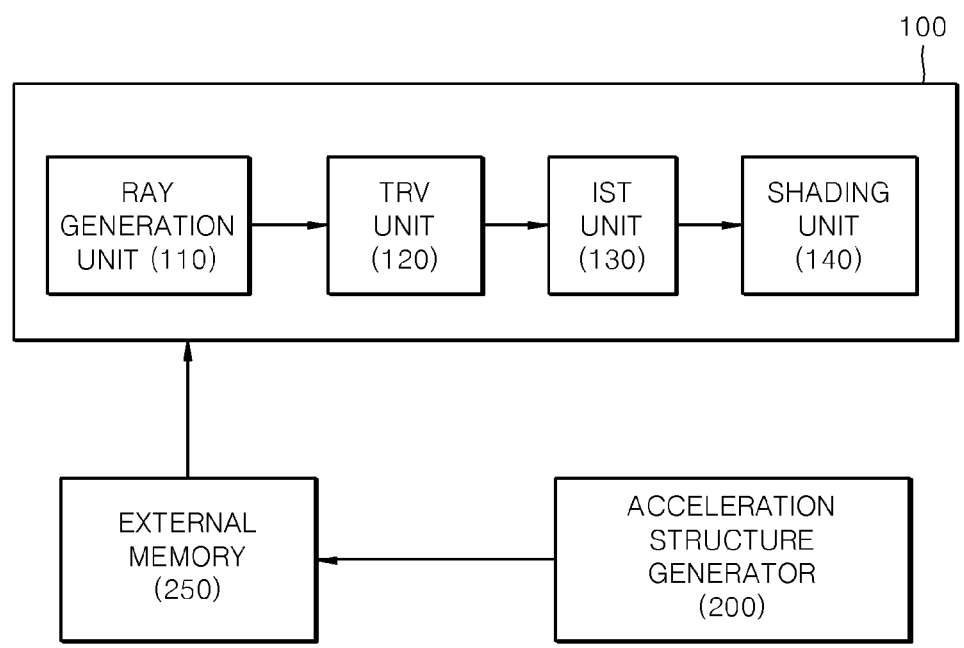
FIG. 2 is a diagram illustrating an example of a ray tracing system.

In the 3D modeling, a rendering apparatus, such as a ray tracing apparatus 100 of FIG. 2, may determine a viewpoint 10 and an image 15 according to the viewpoint to generate a 3D image as illustrated FIG. 1. When the viewpoint 10 and the image 15 are determined, the ray tracing apparatus 100 generates rays for pixels of the image 15 from the viewpoint 10. For example, as illustrated in FIG. 1, when the image 15 has a resolution of 4×3, rays may be generated for the twelve pixels. For convenience of explanation, only a ray for one pixel (e.g., pixel A) will be described below.

Referring to FIG. 1, a primary ray 40 for the pixel A is generated from the viewpoint 10. The primary ray 40 passes through a 3D space and then arrives at the first object 31. The first object 31 may consist of a set of uniform unit regions (hereinafter referred to as a 'primitive'). For example, the primitive may be a polygon, such as, for example, a triangle or a tetragon. Hereinafter, for convenience of explanation, it is assumed that the primitive is a triangle.

A shadow ray 50, a reflected ray 60, and a refracted ray 70 may be generated at a hit point between the primary ray 40 and the first object 31. The shadow ray 50, the reflected ray 60, and the refracted ray 70 may be also referred to as secondary rays.

The shadow ray 50 is generated from the hit point in a direction of the light source 80. The reflected ray 60 is generated in a direction corresponding to an incidence angle of the primary ray 40 and is assigned a weight according to the reflectivity of the first object 31. The refracted ray 70 is generated in a direction corresponding to the incidence angle of the primary ray 40 and the refractivity of the first object 31, and is assigned a weight according to the refractivity of the first object 31.

The ray tracing apparatus 100 determines whether the hit point is exposed to the light source 80, based on the shadow ray 50. For example, as illustrated in FIG. 1, when the shadow ray 50 meets the second object 32, a shadow may be generated at a hit point caused by the shadow ray 50.

Also, the ray tracing apparatus 100 determines whether the refracted ray 70 and the reflected ray 60 hit any other object. For example, as illustrated in FIG. 1, no object is present in a direction of the refracted ray 70, but the reflected ray 60 arrives at the third object 33. The ray tracing apparatus 100 checks the coordinates and color information of a hit point of the third object 33 and generates a shadow ray 90 from the hit point of the third object 33. The ray tracing apparatus 100 also determines whether the shadow ray 90 is exposed to the light source 80. Since the third object 33 has a reflectivity and a refractivity that are '0,' a reflected ray and a refracted ray for the third object 33 are not generated.

As described above, the ray tracing apparatus 100 analyzes the primary ray 40 for the pixel A and all rays derived from the primary ray 40 and determines a color value of the pixel A based on the analysis. The determination of the color value of the pixel A is influenced by the color of the hit point of the primary ray 40, the color of the hit point of the reflected ray 60, and whether the shadow ray 50 arrives at the light source 80. The ray tracing apparatus 100 may form the image 15 by performing the above process on all the pixels of the image 15.

FIG. 2 is a diagram illustrating an example of a ray tracing system. Referring to FIG. 2, the ray tracing system may include the ray tracing apparatus 100, an external memory 250, and an acceleration structure generator 200. The ray tracing apparatus 100 may include a ray generation unit 110, a traversal (TRV) unit 120, an intersection (IST) unit 130, and a shading unit 140.

The ray generation unit 110 may generate a primary ray and rays derived from the primary ray. The ray generation unit 110 may generate the primary ray from the viewpoint 10 and a secondary ray at a hit point between the primary ray and the first object 31 as described above with reference to FIG. 1. In this case, the secondary ray may be either a ray reflected or refracted from a point where the primary ray intersects the object or it may be a shadow ray generated at this point.

Also, the ray generation unit 110 may generate a tertiary ray at a hit point between a secondary ray and the object. The ray generation unit 110 may continuously generate rays until rays do not intersect the object or the rays have been generated a predetermined number of times.

The TRV unit 120 may receive information regarding generated rays from the ray generation unit 110. The generated rays include all the primary ray and rays derived from the primary ray (i.e., the secondary ray, the tertiary ray, etc.). For example, the TRV unit 120 may receive information regarding a point of time when the primary ray is generated and the direction of the primary ray. The TRV unit 120 may receive information regarding a starting point and direction of the secondary ray. The starting point of the secondary ray refers to a point at which the primary ray intersects the object. Also, the viewpoint or starting point of the secondary ray may be expressed in coordinates and the direction of the ray may be expressed in vector notation.

The TRV unit 120 may read information regarding an acceleration structure (AS) from the external memory 250. The acceleration structure (AS) is generated by the acceleration structure generator 200 and stored in the external memory 250. The acceleration structure generator 200 may generate an acceleration structure containing location information of objects in a 3D space. The acceleration structure generator 200 splits the 3D space into a hierarchical tree form. The acceleration structure generator 200 may generate acceleration structures in various shapes. For example, the acceleration structure generator 200 may generate an acceleration structure representing the relationship between objects in a 3D space by applying a K-dimensional tree (KD-tree), a bounding volume hierarchy (BVH) method, spatial splits-in-BVH (SBVH), occlusion surface area heuristic (OSAH), or ambient occlusion BVH (AOBVH).

Figure 3:
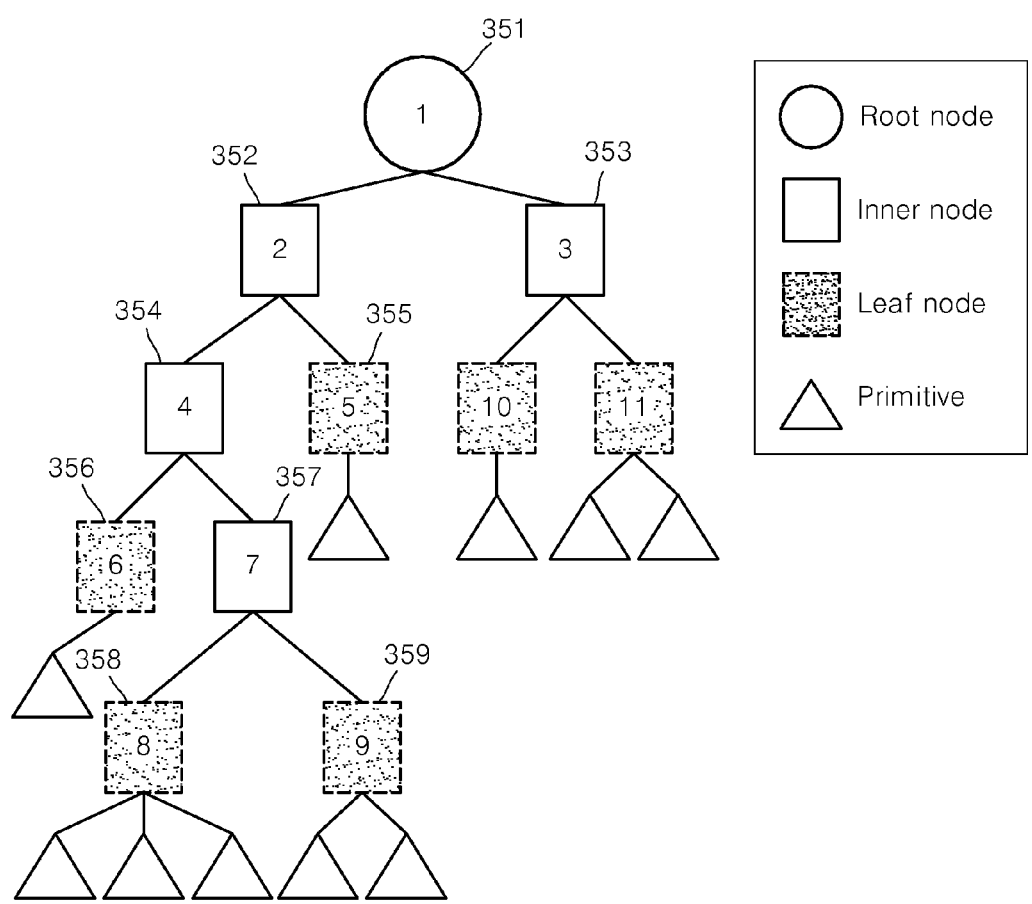
FIG. 3 is a diagram illustrating an example of an acceleration structure in a ray tracing system.

FIG. 3 is a diagram illustrating an example of an acceleration structure (AS) in a ray tracing system. For convenience of explanation, each node in the acceleration structure (AS) will be referred to by using a number assigned to the node. For example, a node 351, which is assigned a number '1' and has a round shape, is referred to as a first node 351. A node 352, which is assigned a number '2' and has a tetragonal shape is referred to as a second node 352. A node 355, which is assigned a number '5' and has a dotted line tetragonal shape is referred to as a fifth node 355. Primitives have a triangular shape and are not assigned any number. The acceleration structure (AS) may include a root node, inner nodes, leaf nodes, and primitives.

In FIG. 3, the first node 351 is a root node. The root node is a highest node that does not have a parent node and has child nodes. For example, child nodes of the first node 351 are the second node 352 and the third node 353, and the first node 351 has no parent node.

The second node 352 may be an inner node. The inner node has both a parent node and child nodes. For example, the parent node of the second node 352 is the first node 351, and the child nodes of the second node 352 are a fourth node 354 and a fifth node 355.

An eighth node 358 may be a leaf node. The leaf node is a lowest node that has no child node, but has a parent node. For example, the parent node of the eight node 358 is a seventh node 357, and the eight node 358 does not have a child node. A leaf node may include primitives belonging to the leaf node. For example, as illustrated in FIG. 3, a sixth node 356 which is a leaf node includes one primitive, the eight node 358 which is a leaf node includes three primitives, and a ninth node 359 which is a leaf node includes two primitives.

Referring back to FIG. 2, the TRV unit 120 may detect a leaf node that intersects a ray by traversing the information regarding the acceleration structure (AS). The IST unit 130 may receive information regarding the detected leaf node that intersects the ray from the TRV unit 120. The IST unit 130 may read information (geometry data) regarding the primitives belonging to the detected left node, from the external memory 250. The IST unit 130 may perform the intersection test between a ray and the primitives based on the information regarding the primitives. For example, the IST unit 130 may test which one of a plurality of primitives belonging to the leaf node that is detected by the TRV unit 120 intersects a ray. Thus, a primitive that intersects a ray may be detected, and a hit point at which the detected primitive and the ray intersect may be calculated. The calculated hit point may be output from the shading unit 140 in the form of coordinates.

The shading unit 140 may determine a color value of a pixel based on information regarding the hit point and characteristics of a material at the hit point. The shading unit 140 may determine a color value of a pixel in consideration of a basic color of the material at the hit point, effects caused by a light source, etc.

For example, in the case of the pixel A of FIG. 1, the shading unit 140 may determine a color value of the pixel A in consideration of effects caused by all the primary ray 40, and the secondary rays, i.e., the refracted ray 70, the reflected ray 60, and the shadow ray 50.

The ray tracing apparatus 100 may receive data needed to perform ray tracing from the external memory 250. The external memory 250 may store the acceleration structure (AS) or the geometry data. The acceleration structure (AS) is generated by the acceleration structure generator 200 and stored in the external memory 250.

The geometry data represents information regarding primitives. A primitive may be a polygon such as, for example, a triangle or a tetragon. The geometry data may represent information regarding apexes and locations of primitives included in an object. For example, when primitives are triangles, the geometry data may include the coordinates, normal vector, or texture coordinates of the apexes of the triangles.

As described above with reference to FIGS. 2 and 3, the ray tracing apparatus 100 may detect a leaf node that intersects a ray by traversing the acceleration structure (AS).

The ray tracing apparatus 100 may traverse the acceleration structure (AS) through one path, and may traverse the acceleration structure (AS) through another path when the tracing of the acceleration structure (AS) is completed.

The acceleration structure generator 200 may generate an acceleration structure that may be traversed with a minimum amount of calculation in a ray tracing system. The acceleration structure generator 200 may detect an optimum space split location that minimizes traversing costs and generate an acceleration structure corresponding to the optimum space partition location, which will be described with reference to FIGS. 4 to 8.

Figure 4:
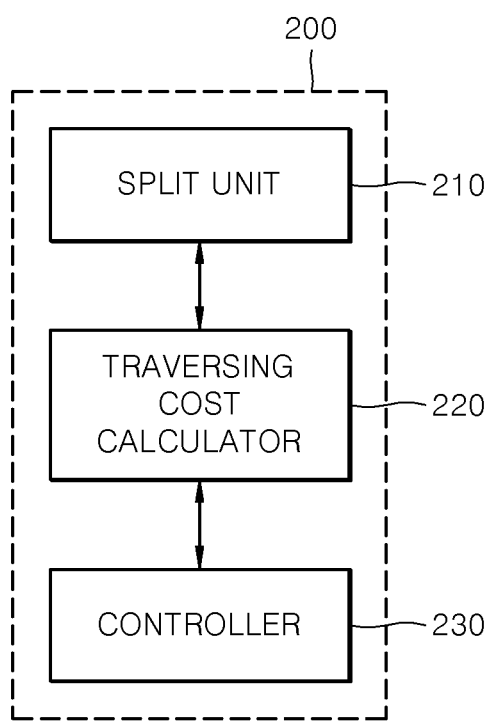
FIG. 4 is a diagram illustrating an example of an acceleration structure generator included in a ray tracing system.

FIG. 4 is a diagram illustrating an example of an acceleration structure generator 200 included in a ray tracing system. As described above with reference to FIG. 2, the acceleration structure generator 200 may generate an acceleration structure and store the acceleration structure in the external memory 250. Referring to FIG. 4, the acceleration structure generator 200 may include a split unit 210, a traversing cost calculator 220, and a controller 230.

The split unit 210 may split a space including a 3D object into a plurality of sub spaces. The split unit 210 may select a split plane with respect to the space and split the space into a plurality of sub spaces based on the selected split plane.

The split unit 210 may split the space using a plurality of split planes. Two sub spaces may be formed when the space is split by one split plane. Three or more sub spaces may be formed when the space is split by a plurality of split planes.

The traversing cost calculator 220 may calculate costs for traversing the plurality of sub spaces based on occlusion information of each of primitives included in the plurality of sub spaces formed by the split plane. The occlusion information of each of the primitives may be represented by the degree by which the primitive is occluded by a neighboring primitive, and the value of the occlusion information may be determined by a degree to which an ambient occlusion (AO) ray generated from the primitive intersects the neighboring primitive.

The traversing cost calculator 220 may calculate traversing costs for each of a plurality of split methods of splitting a space. The controller 230 may detect a split method that minimizes traversing costs. The controller 230 may also generate an acceleration structure corresponding to the detected split method. For example, the controller 230 may generate an acceleration structure by setting a plurality of sub spaces obtained according to the split method that minimizes traversing costs, as nodes.

Figure 5:
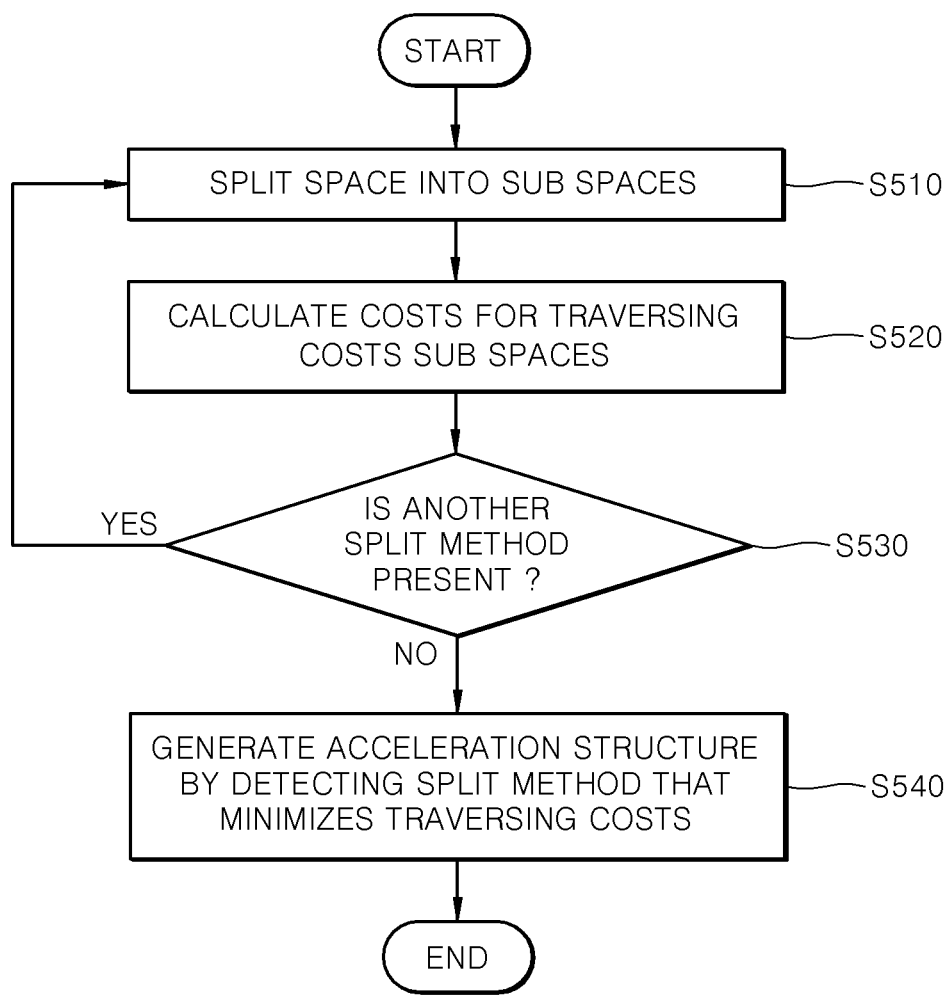
FIG. 5 is a diagram illustrating an example of a method of generating an acceleration structure in a ray tracing system.

FIG. 5 is a diagram illustrating an example of a method of generating an acceleration structure in a ray tracing system. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently.

In S510, the acceleration structure generator 200 of FIG. 4 may split a space including a 3D object into a plurality of sub spaces. For example, the acceleration structure generator 200 may select a split plane for the space and form a plurality of sub spaces by splitting the space based on the split plane. A plurality of split planes may be selected for the space. Two sub spaces are formed when one split plane is selected, and three or more sub spaces are formed when two or more split planes are selected.

The split plane may be determined in various ways. For example, in FIG. 6A a space S is split based on a first split plane 610. As another example, in FIG. 6B the space S is split based on a second split plane 620.

Figure 6A:
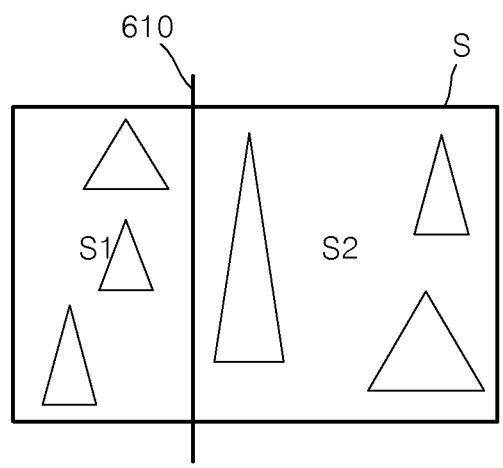
FIGS. 6A and 6B are a diagrams illustrating examples of methods of generating an acceleration structure in a ray tracing system.

When the space S is split based on the first split plane 610 as illustrated in FIG. 6A, a first sub space S1 and a second sub space S2 may be formed. The first and second sub spaces S1 and S2 may correspond to nodes of an acceleration structure.

Each of the first sub space S1 and the second sub space S2 may include three primitives.

Figure 6B:
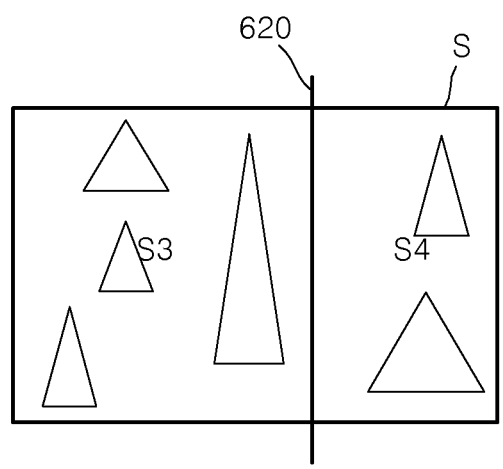

When the space S is split based on the second split plane 620 as illustrated in FIG. 6B, a third sub space S3 and a fourth sub space S4 may be formed. Thus, the third sub space S3 may include four primitives and the fourth sub space S4 may include two primitives.

Referring back to FIG. 5, in S520, the acceleration structure generator 200 may calculate costs for traversing the plurality of sub spaces based on occlusion information of each of primitives included in the plurality of sub spaces formed by the split plane. The occlusion information of each of the primitives may be data representing the degree to which the primitive is occluded by a neighboring primitive.

Figure 7:
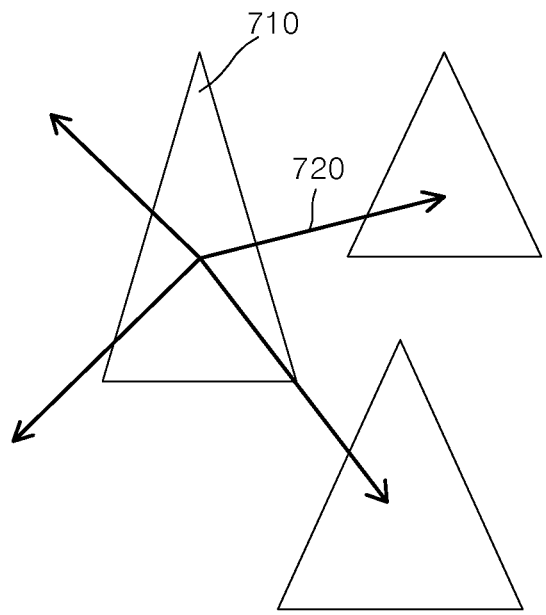
FIG. 7 is a diagram illustrating an example of ambient occlusion (AO) rays.

For example, as illustrated in FIG. 7, the occlusion information of each of the primitives may be obtained by generating an ambient occlusion (AO) ray 720 from a primitive 710 and determining a degree to which the AO ray 720 intersects neighboring primitives. The AO ray 720 may be a ray generated from the primitive 710 in a random direction, and a plurality of AO rays 720 may be generated.

For example, the occlusion information may have a value between '0' and '1' when the AO ray 720 intersects other primitives within a preset range, and may have a value '1' when the AO ray 720 does not intersect other primitives. Thus, the higher the degree to which a primitive is occluded by a neighboring primitive, the smaller the value of the occlusion information. The lower the degree to which the primitive is occluded by the neighboring primitive, the greater the value of the occlusion information. A maximum value of the occlusion information may be '1'.

As illustrated in FIG. 7, when a plurality of AO rays 720 are generated for one primitive 710, a value of occlusion information of the primitive 710 may be an average of values of occlusion information calculated with respect to the plurality of AO rays 720.

The value of occlusion information of a primitive may represent visibility of the primitive that is independent of a viewpoint. The acceleration structure generator 200 may calculate costs for traversing a plurality of sub spaces formed by a split plane according to a surface area heuristic (SAH) method. For convenience of explanation, costs for traversing the first sub space S1 and the second sub space S2 formed by the first split plane 610 illustrated in FIG. 6A will be described below.

If costs for traversing one node is T1, costs for traversing a first node corresponding to the first sub space S1 and a second node corresponding to the second sub space S2 may be calculated to be 2×T1.

Also, a probability that a ray will pass through the first sub space S1 and a probability that the ray will pass through the second sub space S2 may be expressed by Equation (1) below.

$$P(S1|S)=A(S1)/A(S)$$

$$P(S2|S)=A(S2)/A(S) \quad \text{[Equation 1]}$$

In Equation 1, 'A(S)' denotes a surface area of the space S, 'A(S1)' denotes a surface area of the first sub space S1, and 'A(S2)' denotes a surface area of the second sub space S2.

Thus, costs Tpri(S1) for conducting the intersection test on primitives included in the first node and costs Tpri(S2) for conducting the intersection test on primitives included in the second node may be expressed by Equation (2) below, in consideration of the visibility of the primitives that are independent from a viewpoint.

$$Tpri(S1)=A(S1)/A(S)\times AO(S1)\times T2$$

$$Tpri(S2)=A(S2)/A(S)\times AO(S2)\times T2 \quad \text{[Equation 2]}$$

In Equation 2, 'T2' denotes costs for conducting the intersection test on one primitive, 'AO(S1)' denotes the sum of occlusion information of primitives included in the first sub space S1, and, 'AO(S2)' denotes the sum of occlusion information of primitives included in the second sub space S2.

The sum AO(S1) of the occlusion information of the primitives included in the first sub space S1 and the sum AO(S2) of the occlusion information of the primitives included in the second sub space S2 may be obtained using AO rays. For example, the AO ray 720 may be generated from the primitive 710 included in the first sub space S1 as illustrated in FIG. 7, and a value of the occlusion information AO_Cost may be calculated using an intersection value T of the AO ray 720 that intersects neighboring primitives (intersection range of the neighboring primitives).

$$sAO\_Cost=clamp(T,0,AO\_cut\_off)/AO\_cut\_off \quad \text{[Equation 3]}$$

In Equation 3, the value of the occlusion information AO_Cost may be '1' when the intersection value 'T' is equal to or greater than a reference occlusion value AO_cut_off, and may be a value obtained by normalizing the intersection value 'T' to a value between '0' and '1' when the intersection value 'T' is less than the reference occlusion value AO_cut_off.

Thus, the occlusion information has a value '1' when the AO ray 720 does not intersect another primitive within a predetermined range (range of reference occlusion value AO_cut_off), and has a value between '0' and '1' when the AO ray 720 intersects another primitive within the predetermined range (range of reference occlusion value AO_cut_off).

When a plurality of AO rays are generated, for example, when the AO rays 720 include a first AO ray, a second AO ray, a third AO ray, and a fourth AO ray as illustrated in FIG. 7, occlusion information values (first to fourth occlusion information values) of the respective AO rays are calculated and an average of the occlusion information values may be used in calculating traversing costs.

Thus, the plurality of sub spaces formed by the first split plane 610 may be expressed by Equation 4 below.

$$T=2\times T1+A(S1)/A(S)\times AO(S1)\times T2+A(S2)/A(S)\times AO(S2)\times T2 \quad \text{[Equation 4]}$$

The acceleration structure generator 200 may calculate traversing costs by using Equation 4.

For example, as illustrated in FIG. 6A, when the space is split based on the first split plane 610, first traversing costs may be calculated with respect to a first split method (split method using the first split plane 610) by using the sum AO(S1) of the occlusion information values of the primitives of the first sub space S1 and the sum AO(S2) of the occlusion information values of the primitives of the second sub space S2.

In S530, the acceleration structure generator 200 may determine whether another split method is present after the traversing costs are calculated according to the first split method. When it is determined that another split method is present, the acceleration structure generator 200 may calculate costs for traversing a plurality of sub spaces split according to the other split method.

For example, costs for traversing the third sub space S3 and the fourth sub space S4 formed by the second split plane 620 illustrated in FIG. 6B may be calculated. The second traversing costs may be calculated with respect to a second split method (split method using the second split plane 620), similar to the method of calculating the first traversing costs.

In S540, when it is determined that another split method is not present, a split method that minimizes traversing costs may be detected by comparing the traversing costs, and an acceleration structure corresponding to the detected split method may be generated.

Figure 8:
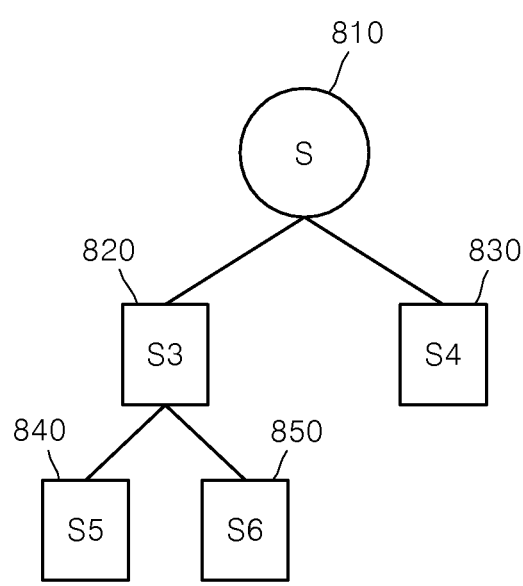
FIG. 8 is a diagram illustrating an example of a part of an acceleration structure.

For example, as illustrated in FIG. 8, when the second traversing costs are determined to be the minimum costs among the calculated traversing costs, an acceleration structure corresponding to the second split method may be generated. The acceleration structure generator 200 may generate an acceleration structure by setting the third sub space S3 and the fourth sub space S4 divided from the space by the second split plane 620 as nodes.

For example, as illustrated in FIGS. 6 and 8, a node 810 corresponding to the whole space S may be set as a root node, and a node 820 corresponding to the third sub space S3 and a node 830 corresponding to the fourth sub space S4 may be set as child nodes of the node 810 corresponding to the whole space S.

The acceleration structure generator 200 may split the third sub space into a plurality of sub spaces, calculate traversing costs, and detect a split method that minimizes traversing costs. As illustrated in FIG. 8, the acceleration structure generator 200 may set nodes 840 and 850 corresponding to the plurality of sub spaces (fifth sub space and sixth sub space) obtained according to the detected split method as child nodes of the node 820 corresponding to the third sub space. Thus, the acceleration structure generator 200 may generate an acceleration structure by continuously detecting a sub space that minimizes traversing costs.

Table 1 below shows a method of generating an acceleration structure and the amount of calculation performed by a TRV unit and an IST unit according to a viewpoint. Also, Table 1 shows reduction rates in the amounts of calculation in comparative example 2, comparative example 3, and embodiment 1, compared to the amount of calculation according to comparative example 1.

TABLE 1

|  | Comparative example 1 | Comparative example 2 | Comparative example 3 | Embodiment 1 |
| --- | --- | --- | --- | --- |
| Viewpoint 1 IST + TRV calculation amount (reduction rate) | 52.9 (0.0%) | 34.4 (34.9%) | 33.9 (35.9%) | 31.41 (40.6%) |
| Viewpoint 2 IST + TRV calculation amount (reduction rate) | 44.9 (0.0%) | 36.4 (18.9%) | 36.1 (19.5%) | 30.80 (31.4%) |

Referring to Table 1, comparative example 1 is an example where an acceleration structure is generated using the BVH method. The BVH method is a method of splitting a space based on a bounding box including primitives.

Comparative example 2 is an example where an acceleration structure is generated using the SBVH method. The SBVH method is a method of dividing primitives to be included in bounding boxes at both sides, thereby minimizing overlapping of the bounding boxes.

Comparative example 3 is an example where an acceleration structure is generated using the OSAH method. The OSAH method is a method of locating a primitive having visibility to be adjacent to a root node by additionally applying visibility information at a specific viewpoint.

Embodiment 1 shows an acceleration structure that is generated by splitting a space according to the examples described with reference to FIG. 1-8 above.

Referring to Table 1, embodiment 1 shows that a reduction rate in the amount of calculation is 40.6% at the viewpoint 1 and 30.80% at viewpoint 2, compared to comparative example 1. Also, referring to Table 1, the reduction rates in the amount of calculation according to embodiment 1 at viewpoints 1 and 2 are greater than those according to comparative examples 2 and 3.

Thus, an acceleration structure generated using a method of generating an acceleration structure according to an embodiment of the present invention is capable of reducing the amount of calculation performed by a TRV unit and an IST unit and increasing the efficiency of ray tracing.

As described above, according to the one or more of the above examples, an acceleration structure may be efficiently traversed and the amount of calculation needed to traverse the acceleration structure may thus be minimized. Also, node fetches generated during traversing of an acceleration structure may be reduced to decrease a memory usage. Accordingly, the performance and processing speed of a ray tracing processing apparatus may be improved.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of generating an acceleration structure in a ray tracing system, the method comprising:
splitting, at an acceleration structure generator, a space comprising a three-dimensional (3D) object into sub spaces;
calculating costs for traversing the sub spaces based on a sum of occlusion information of primitives in the respective one of the sub spaces, summed over each of the sub spaces;
selecting the sub spaces that minimize the costs for traversing; and
generating an acceleration structure based on setting the selected sub spaces as nodes, wherein the occlusion information of the primitives represent a degree to which an ambient occlusion (AO) ray generated from the primitives intersects neighboring primitives, and visibility of the primitives that is independent of a viewpoint.

2. The method of claim 1, wherein the occlusion information of a primitive represents a degree to which the primitive is occluded by a neighboring primitive.

3. The method of claim 1, wherein the calculating of the costs for traversing the sub spaces comprises determining a value of the occlusion information of the primitives to be between '0' and '1' when an ambient occlusion (AO) ray intersects neighboring primitives within a predetermined range, and to be '1' when the AO ray does not intersect the neighboring primitives within the predetermined range.

4. The method of claim 1, wherein the costs for traversing the sub spaces are calculated, based on one of costs for conducting a ray-node intersection test, a probability that a ray will pass through each of the sub spaces, or costs for conducting a ray-primitive intersection test.

5. The method of claim 1, wherein the costs for traversing the sub spaces are calculated based on a surface area heuristic (SAH) method.

6. The method of claim 5, wherein the costs for traversing the sub spaces are calculated based on:

$$T=2\times T1+A(S1)/A(S)\times AO(S1)\times T2+A(S2)/A(S)\times AO(S2)\times T2,$$

wherein T denotes the costs for traversing the sub spaces, T1 denotes a cost for conducting a ray-node intersection test, A(S1) denotes a surface area of primitives in a first sub space, A(S2) denotes a surface area of primitives in a second sub space, A(S) denotes a surface area of primitives in the space, T2 denotes a cost for conducting a ray-primitive intersection test, AO(S1) denotes a sum of occlusion information of the primitives in the first sub space, and AO(S2) denotes a sum of occlusion information of the primitives in the second sub space.

7. The method of claim 1, wherein the calculating of the costs for traversing the sub spaces comprises calculating an average of occlusion information values for ambient occlusion (AO) rays when the AO rays correspond to one primitive and setting the calculated average to an occlusion information value of the primitive.

8. A non-transitory computer readable recording medium, that is not a signal, having recorded thereon a program for causing a computer to execute the method of claim 1.

9. An apparatus for generating an acceleration structure in a ray tracing system, the apparatus comprising:
one or more processors configured to: split a space comprising a three-dimensional (3D) object into sub spaces,
calculate costs for traversing the sub spaces based on a sum of occlusion information of primitives in the respective one of the sub spaces, summed over each of the sub spaces, and
to select the sub spaces that minimizes the costs for traversing and to generate an acceleration structure based on setting the selected sub spaces as nodes, wherein the occlusion information of the primitives represent a degree to which an ambient occlusion (AO) ray generated from the primitives intersects neighboring primitives, and visibility of the primitives that is independent of a viewpoint.

10. The apparatus of claim 9, wherein the occlusion information of a primitive represents a degree to which the primitive is occluded by a neighboring primitive.

11. The apparatus of claim 9, wherein the one or more processors is further configured to determine a value of the occlusion information of the primitives to be between '0' and '1' when an ambient occlusion (AO) ray intersects neighboring primitives within a predetermined range, and to be '1' when the AO ray does not intersect the neighboring primitives within the predetermined range.

12. The apparatus of claim 9, wherein the one or more processors is further configured to calculate the costs for traversing the sub spaces, based on at least one of costs for conducting a ray-node intersection test, a probability that a ray will pass through each of the sub spaces, or costs for conducting a ray-primitive intersection test.

13. The apparatus of claim 9, wherein the processor is further configured to calculate the costs for traversing the sub spaces based on a surface area heuristic (SAH) method.

14. The apparatus of claim 9, wherein the processor is further configured to calculate the costs for traversing the sub spaces based on:

$$T=2\times T1+A(S1)/A(S)\times AO(S1)\times T2+A(S2)/A(S)\times AO(S2)\times T2,$$

wherein T denotes the costs for traversing the sub spaces, T1 denotes a cost for conducting a ray-node intersection test, A(S1) denotes a surface area of primitives in a first sub space, A(S2) denotes a surface area of primitives in a second sub space, A(S) denotes a surface area of primitives in the space, T2 denotes a cost for conducting a ray-primitive intersection test, AO(S1) denotes a sum of occlusion information of the primitives in the first sub space, and AO(S2) denotes a sum of occlusion information of the primitives in the second sub space.

15. The apparatus of claim 9, wherein the traversing cost calculator is further configured to calculate an average of occlusion information values for ambient occlusion (AO)

rays when the AO rays correspond to one primitive, and to set the calculated average as an occlusion information value of the primitive.

16. A ray tracing apparatus comprising:
one or more configured to: generate primary and secondary rays,
to detect a leaf node that intersects a ray by traversing the information regarding an acceleration structure,
to receive information regarding the detected leaf node, to detect a primitive that intersects the ray, and to calculate a hit point at which the detected primitive and the ray intersect,
to determine a color value of a pixel based on information regarding the hit point and characteristics of a material at the hit point,
to split a space comprising a three-dimensional (3D) object into sub spaces,
to calculate costs for traversing sub spaces based on a sum of occlusion information of primitives in the respective one of the sub spaces, summed over each of the sub spaces, and
to select the sub spaces that minimizes the costs for traversing and to generate the acceleration structure based on setting the selected sub spaces as nodes, wherein the occlusion information of the primitives represent a degree to which an ambient occlusion (AO) ray generated from the primitives intersect neighboring primitives, and visibility of the primitives that is independent of a viewpoint.

* * * * *